United States Patent [19]

Shimizu et al.

[11] Patent Number: 5,484,856
[45] Date of Patent: Jan. 16, 1996

[54] PROCESS TO PREVENT SCALE ADHESION USING THE CONDENSATION PRODUCT OF AROMATIC AMINE AND AROMATIC TETRACARBOXYLIC ACID ANHYDRIDE

[75] Inventors: Toshihide Shimizu, Urayasu; Mikio Watanabe, Kamisui, both of Japan

[73] Assignee: Shin-Etsu Chemical Co., Ltd., Tokyo, Japan

[21] Appl. No.: 261,297

[22] Filed: Jun. 16, 1994

Related U.S. Application Data

[62] Division of Ser. No. 31,989, Mar. 16, 1993, abandoned.

[30] Foreign Application Priority Data

Mar. 16, 1992 [JP] Japan ................... 4-090200

[51] Int. Cl.$^6$ ................ C08F 2/02; C08F 2/04; C08F 2/22; C08F 2/34
[52] U.S. Cl. ........................... 526/62; 526/74
[58] Field of Search ......................... 526/62, 74

[56] References Cited

U.S. PATENT DOCUMENTS

| | | | |
|---|---|---|---|
| 4,081,248 | 3/1978 | Cohen | 526/62 |
| 4,418,163 | 11/1983 | Murakami et al. | 525/382 |
| 4,904,740 | 2/1990 | Blum et al. | 525/382 |
| 5,218,055 | 6/1993 | Marrion et al. | 525/384 |

OTHER PUBLICATIONS

"Polyimide and Polyimide–Polyurethane Coatings, and their Solderable Electrically Insulated Wires and Flyback Transformers Therefrom" Jpn. Kokai Tokky Koho, Tajima et al., p. 47.
"Polyimide Membranes for Separating Water from Organic Compound", Maeda et al., Jpn Kokai Tokkyo Koho, p. 5.
"Liquid Crystal Device", Matsuda et al., EPA, p. 44.
Miscible Blends of Isopropylidene–Based Polyimide with Poly(aryl sulfones), Harris et al., EPA, p. 36.
"Synthesis and Characterization of Poly(amide imides)", Dezern et al., Polymer Eng. Sci., 31(12), 860–6.
"Heat–Resistant Polymers", Toko et al., Jpn. Kokai Tokkyo Koho, p. 12.
"Base–Soluble Polyimide Release Layer for Microlithographic Processing", Brewer et al., PCT Appl., p. 53.
"Polyimides End–Capped with Diaryl Substituted Acetylene", Paul et al., U.S. Pat. No. 5,138,028.
"Organic Polymer and Preparation and Use Thereof", Takimoto et al., EPA, p. 82.
"Microstructures of Copper Thin Films Sputtered onto Polyimide", Chung et al., Han'guk Ryomyon Konghak Hoechi, 25(2), 90–6.
"Positive Photoresist Composition Containing Polyimide Precursor", Omote et al., EPA, p. 23.
"New Approach to the Description of Young's Modulus for Highly Oriented Polymers. II. Relationship Between Young's Modulus and Thermal Expansion of Polymers Over a Wide Temperature Range", Bronnikov et al., J. Macromol. Sci., Phys., B32(1), 33–50.
Database Chemical Abstracts, CA88(18), 121 917e, 1978, JP-A-52 108 473, Sep. 10, 1977.
H. F. Mark, et al., "Encyclopedia of Polymer Science & Engineering", vol. 12, ed. 2, pp. 364–368 and 394–395, 1988.

Primary Examiner—Joseph L. Schofer
Assistant Examiner—Tom Weber
Attorney, Agent, or Firm—Oblon, Spivak, McClelland, Maier & Neustadt

[57] ABSTRACT

A polymer scale preventive process for use in polymerization of a monomer having an ethylenically unsaturated double bond, comprising an alkaline solution containing a condensation product of (A) an aromatic amine compound having at least two amino groups and (B) an aromatic tetracarboxylic acid anhydride. This process is used for forming a coating on the inner wall, etc. of a polymerization vessel. Such a vessel is effective in preventing polymer scale deposition and useful in producing a polymer that shows very few fish eyes and good whiteness when formed into sheets or the like.

13 Claims, No Drawings

PROCESS TO PREVENT SCALE ADHESION USING THE CONDENSATION PRODUCT OF AROMATIC AMINE AND AROMATIC TETRACARBOXYLIC ACID ANHYDRIDE

This applications is a division of application Ser. No. 08/031,989, filed on Mar. 16, 1993, now abandoned.

BACKGROUND OF THE INVENTION

1. Field of the Invention

The present invention relates to a polymer scale preventive agent useful in polymerization of a monomer having an ethylenically unsaturated double bond, a polymerization vessel effective in preventing polymer scale deposition, and a process of producing a polymer using said vessel.

2. Description of the Prior Art

As a method of polymerizing a monomer having an ethylenically unsaturated double bond, are known suspension polymerization, emulsion polymerization, solution polymerization, gas phase polymerization and bulk polymerization. In any type of the polymerizations, polymer scale is liable to be deposited on the areas with which the monomer comes into contact during polymerization, such as inner walls, agitation equipment and so on of a polymerization vessel.

The deposition of the polymer scale on the inner wall results in disadvantages that the yield of the polymer and cooling capacity of the polymerization vessel are lowered; that the polymer scale may peel and mix into a polymeric product, thereby impairing the quality of thereof; and that removal of such polymer scale is laborious and hence time-consuming. Further, since the polymer scale contains unreacted monomers and operators may be exposed thereto, which may cause physical disorders in the operators.

Heretofore, as a method for preventing polymer scale deposition on the inner wall and so forth, methods by which a polymer scale preventive agent comprising an amine compound, quinone compound, aldehyde compound or the like is coated on the inner wall, etc. of a polymerization vessel or methods by which such compounds are added to an aqueous medium for polymerization (Japanese Patent Publication (KOKOKU) No. 45-30343 (1960)).

These methods can prevent the deposition of polymer scale if polymerization run is repeated within about 5 or 6 times; however, the number of repetition of polymerization run exceeds 5 or 6, the scale preventive effect is weakened. That is, the scale preventive effect is poor in durability. Particularly, the scale preventive effect is adversely affected where a water-soluble catalyst is used and unsatisfactory industrially.

It is proposed in Japanese Pre-examination Patent Publication (KOKAI) No. 53-13689(1978) to form a coating of a condensation product of an aromatic amine compound on the areas with which monomers come into contact, such as the inner wall of a polymerization vessel. The formation of the coating of such a condensation product enables repetition of about 100 to 200 polymerization runs without deposition of polymer scale on the areas in the liquid phase, i.e., under the liquid surface inside the polymerization vessel.

However, polymer scale deposition is liable to occur in the vicinity of the interface between the gas phase and the liquid phase which is located at the upper section of a polymerization vessel. Once polymer scale is deposited in the vicinity of the interface between the gas phase and the liquid phase, the deposited scale will grow gradually as polymerization runs are repeated, and at last it is peeled from the inner wall, etc. and incorporated into the polymeric product. If the polymeric product containing the polymer scale is processed into formed products such as sheets or the like, the polymer scale causes increase in fish eyes in the formed products, lowering seriously the quality thereof.

Polymeric products obtained by polymerization are required to have a high whiteness. That is, when a polymeric product is formed into a sheet or the like without any addition of a coloring agent, the resulting formed product is more or less colored. Such coloration is called initial coloration, which is desired to be as low as possible. However, the coating comprising said condensation product of an aromatic amine compound disclosed in the Japanese Pre-examination Publication may be peeled or dissolved into a polymeric product, thereby lowering the whiteness or increasing the initial coloration thereof.

SUMMARY OF THE INVENTION

It is accordingly an object of the present invention to provide a polymer scale preventive agent for use in polymerization of a monomer having an ethylenically unsaturated double bond that can prevent effectively the deposition of polymer scale not only in the areas in the liquid phase but also in the vicinity of the interface between the gas and liquid phases, and can produce polymeric products with a very small number of fish eyes and low initial coloration after processed into formed products such as sheets or the like, a polymerization vessel using the same, and a process of producing a polymer using the vessel.

Thus, the present invention provides a polymer scale preventive agent for use in polymerization of a monomer having an ethylenically unsaturated double bond, comprising an alkaline solution containing a condensation product of (A) an aromatic amine compound having at least two amino groups and (B) an aromatic tetracarboxylic acid anhydride.

The present invention also provides a polymerization vessel for use in polymerization of a monomer having an ethylenically unsaturated double bond, having on its inner wall surfaces a polymer scale preventive coating, wherein said coating has been formed by applying an alkaline solution containing a condensation product of (A) an aromatic amine compound having at least two amino groups and (B) an aromatic tetracarboxylic acid anhydride, followed by drying.

Further, the present invention provides a process of producing a polymer of an ethylenically unsaturated double bond, which comprises polymerizing the monomer in a polymerization vessel having a polymer scale preventive coating on its inner wall surfaces, wherein said coating has been formed by applying an alkaline solution containing a condensation product of (A) an aromatic amine compound having at least two amino groups and (B) an aromatic tetracarboxylic acid anhydride, followed by drying.

According to the present invention, deposition of polymer scale can be effectively prevented not only on the areas in the liquid phase but also in the vicinity of the interface between the gas and liquid phases in a polymerization vessel. Therefore, the present invention makes it unnecessary to conduct the operation of removing the polymer scale after every polymerization run, and the productivity is thereby improved.

Further, when the polymeric product obtained by the application of the present invention is processed into formed products such as sheets, the resulting formed products have very few fish eyes.

Furthermore, the formed products obtained as above is low in initial coloration. That is, the formed products exhibit a luminosity index L in the Hunter's color difference equation described in JIS Z 8730(1980) of 70 or more in the case of vinyl chloride polymers and 80 or more in the case of SBR.

DETAILED DESCRIPTION OF PREFERRED EMBODIMENTS

The condensation product, the essential component of the polymer scale preventive agent, is obtained by condensing (A) an aromatic amine compound having at least two amino groups and (B) an aromatic tetracarboxylic acid anhydride.

Raw materials and syntheses thereof are described below.

(A) Aromatic amine compound having at least two amino groups

The component (A) is an aromatic amine compound having at least two amino groups, and represented, for example, by the general formulas (1) to (13):

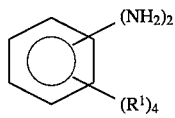
(1)

wherein the plural may be the same or different and are each an atom or group selected from the group consisting of —H, —NH$_2$, —Cl, —OH, —NO$_2$, —COCH$_3$, —OCH$_3$, —N(CH$_3$)$_2$, —COOH, —SO$_3$H and alkyl groups having 1 to 3 carbon atoms.

Specifically, the compounds of the general formula (1) include, for example, o-, m- and p-aminobenzenes, 3,4- and 3,5-diaminobenzoic acids, 2,5-diaminobenzenesulfonic acid, 3,4-diaminochlorobenzene, 3,4-diaminophenol, 1,2-diamino- 4-nitrobenzene, 2,4-diamino-l-nitrobenzene, 2,4-, 2,5- and 2,6-diaminotoluenes, 2,5- and 2,6-diamino-m-xylenes, 2,5- and 2,6-diamino-p-xylenes, and the like.

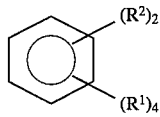
(2)

wherein the plural R$^1$ may be the same or different and each are as defined above, and R$^2$ may be the same or different and each are an amino group-containing alkyl group having 1 to 10 carbon atoms.

Specifically, the compounds of the general formula (2) include, for example, 2,4-bis(β-amino-t-butyl)toluene, p-bis(2-methyl-4-aminopentyl)benzene, p-bis(1,1-dimethyl-5-aminopentyl)benzene, and the like.

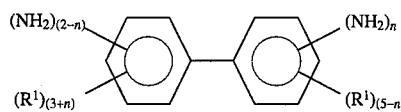
(3)

wherein the plural R$^1$ may be the same or different and each as defined above, and n is an integer of 1 or 2.

Specifically, the compounds of the general formula (3) include, for example, 4,4'-diamino-3,3'-biphenyldiol, 3,3'-dimethyl-4,4'-diaminobiphenyl, 3,3'-dimethoxy-4,4'-diaminobiphenyl, 4,4'-diaminobiphenyl and the like.

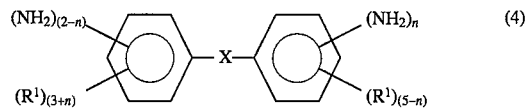
(4)

wherein the plural R$^1$ may be the same or different and are as defined above, n is also as defined above, and X is a divalent alkylene group having 1 to 5 carbon atoms, —CH=CH—, —N=N—, —N(CH$_3$)—, —CONH—, —P(=O)H—, —SO$_2$—, —O—, —S, —Si(R)$_2$—, where R is an alkyl group containing 1 to 10 carbon atoms, or the group having the formula:

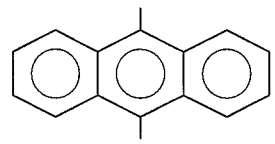

Specifically, the compounds of the formula (4) include, for example, 2,4 -diaminoazobenzene, 4,4 '-diaminodiphenyl ether, 4,4'-diaminodiphenylamine, 4,4'-diaminodiphenylmethane, 3,3'- and 4,4'-diaminodiphenyl sulfone, 4,4'-diaminobenzanilide, 4,4'-diaminostilbene, 4,4'-diaminostilbene-2,2'-disulfonic acid, 9,10-bis (4-aminophenyl)anthracene, 4,4'-diaminodiphenyl sulfide, 4,4'-diaminodiphenylpropane, bis(4-aminophenyl)diethylsilane, bis(4-aminophenyl) phosphine, bis(4-aminophenyl)—N-methylamine, and the like.

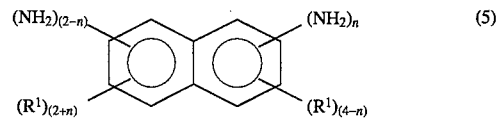
(5)

wherein the plural R$^1$ may be the same or different, and are each as defined above, and n is as defined above.

The specific examples of the compound of the formula (5) include 1,5- and 1,8-diaminonaphthalenes.

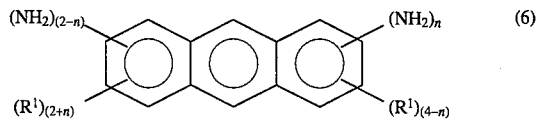
(6)

wherein the plural R$^1$ may be the same or different and each as defined above.

The specific examples of the compound of the formula (6) include 1,4- and 1,5-diaminoanthracene and the like.

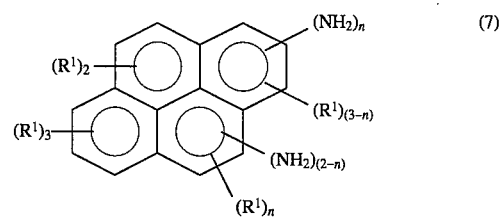
(7)

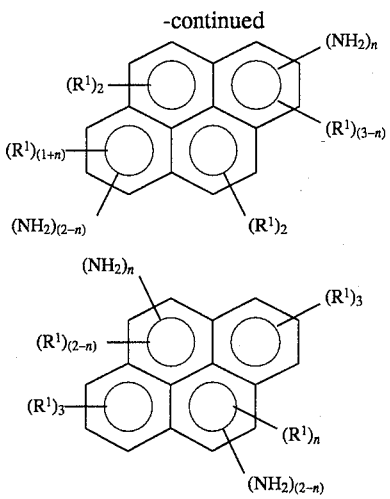

wherein the plural $R^1$ may be the same or different and are each as defined above.

The specific examples thereabove include 1,6-, 1,8-, 3,5- and 5,10-diaminopyrenes.

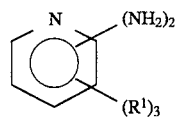

wherein the plural $R^1$ may be the same or different and are as defined above.

The specific examples of the compound of the formula (10) include 2,3-, 3,4- and 2,6-diaminopyridine.

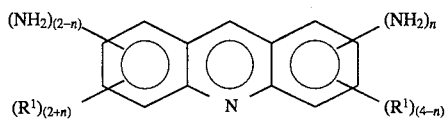

wherein the plural $R^1$ may be the same or different and are as defined as above, and n is as defined above. The specific examples of the compound of the formula (11) include 3,6-diaminoacridine.

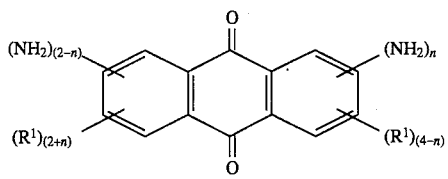

wherein the plural $R^1$ may be the same or different and are as defined above.

The specific examples of the compound of the formula (12) include 1,2-, 1,4- and 2,6-diaminoanthraquinone and the like.

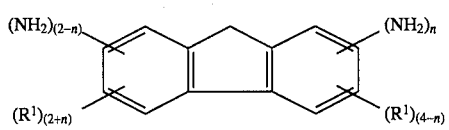

wherein the plural $R^1$ may be the same or different and are as defined above.

The specific examples of the compound of the formula (13) include 2,3- and 2,7-diaminofluorene and the like.

Among the aromatic amine compounds having at least two amino groups, preferred are 4,4'-diaminodiphenylmethane, 4,4'-diaminodiphenyl ether, 4,4'-diaminodiphenyl sulfone, 4,4'-diaminobenzanilide, 4,4'-diaminodiphenyl sulfide, 4,4'-diaminodiphenylpropane, p-aminobenzene, 3,3'-dimethyl-4,4'-diaminobiphenyl, 4,4'-diamino- 3,3'-biphenyldiol, 4,4'-diaminodiphenylamine, 3,5-diaminobenzoic acid, 2,5-diaminobenzenesulfonic acid, and 4,4'-diaminostilbene-2,2'-disulfonic acid. More preferred are 4,4'-diaminodiphenylmethane, 4,4'-diaminodiphenyl ether, 4,4'-diaminodiphenyl sulfone, 4,4'-diaminobenzanilide, 4,4'-diaminodiphenyl sulfide, 3,5-diaminobenzoic acid, 2,5-diaminobenzenesulfonic acid, and 4,4'-diaminostilbene-2,2'-disulfonic acid.

The aromatic amine compounds having at least two amino groups described above can be used singly or in combination of two or more.

(B) Aromatic tetracarboxylic acid anhydride

The aromatic tetracarboxylic acid anhydrides (B) include, for example, pyromellitic anhydrides, 2,2'-bis(3,4-dicarboxyphenyl)propanoic dianhydride, 2,3,6,7-naphthalenetetracarboxylic dianhydride, bis(3,4-dicarboxyphenyl)sulfon dianhydride, 3,4,3',4'-biphenyltetracarboxylic dianhydride, 3,4,9,10-perylenetetracarboxylic dianhydride, 1,2,5,6-naphthalenetetracarboxylic dianhydride, bis(3,4-dicarboxyphenyl) ether dianhydride, 2,3,2',3'-biphenyltetracarboxylic dianhydride, 3,4,3',4'-benzophenonetetracarboxylic dianhydride, 2,3,4,5-thiophenonetetracarboxylic dianhydride, and 2,6,2',6'-biphenyltetracarboxylic dianhydride. Among these compounds, preferred are pyromellitic anhydride, 1,2,5,6-naphthalenetetracarboxylic dianhydride, 2,3,6,7-naphthalenetetracarboxylic dianhydride, 3,4,3',4'-biphenyltetracarboxylic dianhydride, and 2,6,2',6'-biphenyltetracarboxylic dianhydride.

The aromatic tetracarboxylic acid anhydrides can be used singly or in combination of two or more.

Condensation product

The condensation product of the aromatic amine compound having at least two amino groups (A) and the aromatic tetracarboxylic acid anhydride (B), which is the effective component of the present polymer scale preventive agent, can be prepared by reacting the components (A) and (B) at a temperature of room temperature to about 100° C. in a suitable organic solvent-based medium for about 0.5 to 300 hours, preferably at a temperature of from room temperature to 50° C. for 1 to 100 hours.

As the reaction medium for the condensation reaction, normally an organic solvent is used. The organic solvents for the condensation reaction include alcohol solvents such as methanol, ethanol, propanol, butanol, 2-butanol, 2-methyl-1-propanol, 2-methyl-2-propanol, 3-methyl- 1-butanol, 2-methyl-2-butanol, 2-pentanol and the like, ketone solvents such as, for example, acetone, dioxane, methyl ethyl ketone, methyl isobutyl ketone and the like, ester solvents such as methyl formate, ethyl formate, methyl acetate, methyl acetoacetate and the like, ether solvents such as, for example, 4-methyldioxolan, diethyl ether, ethylene glycol diethyl ether and the like, chlorinated hydrocarbons such as, for example, methylene chloride, chloroform, carbon tetrachloride, trichloroethylene, perchloroethylene and the like, hydrocarbon solvents such as, for example, n-heptane, n-hexane and the like, furans such as, for example, tetrahydrofuran, dimethyl formamide, dimethyl acetamide, dimethyl sulfoxide, dimethyl sulfone, acetonitrile, pyridine, N-methylpyrrolidone, m-cresol, etc. These solvents may be used singly or in combination of two or more.

Although the amounts of the aromatic amine compound (A) and the aromatic tetracarboxylic acid anhydride (B) subjected to the condensation reaction depend on the kinds of the aromatic amine compound (A), the aromatic tetracarboxylic acid anhydride (B) and solvent, reaction temperature, reaction time, etc., normally the aromatic tetracarboxylic acid anhydride (B) is used in an amount of about 0.01 to about 5 parts by weight, preferably 0.1 to 3 parts by weight, per part by weight of the aromatic amine compound (A). If the amount of the component (B) is too small or too large relative to that of the component (A), the resulting condensation product is poor in polymer scale preventing effect.

After the completion of the condensation reaction, where the resulting condensation product is settled, the condensation product may be subjected to filtration; where the resulting condensation product is dissolved in the solvent, the solution may be added to a poor solvent, such as water, for example, to settle it in the solution, followed by filtration.

Polymer scale preventive agent comprising an alkaline solution containing the condensation product of components (A) and (B)

The polymer scale preventive agent of the present invention comprises an alkaline solution of the condensation product of the components (A) and (B), which is used for forming a coating on, for example, the inner wall surfaces of a polymerization vessel, and the deposition of polymer scale is thereby prevented.

For example, the polymer scale preventive agent may be prepared by mixing the condensation product with an aqueous solvent and dispersing it therein, and controlling the pH of the resulting mixture to the alkaline range, to form a uniform solution.

Since the polymer scale preventive agent of the present invention is made alkaline as described above, the solubility of the condensation product of the components (A) and (B) in the aqueous solvent is increased and the solution is made uniform, so that its polymer scale preventing effect is presumably enhanced when coated on the inner wall, etc. of a polymerization vessel.

The aqueous solvents to be used for preparation of the polymer scale preventive agent include, for example, water and mixed solvents of water and an organic solvent compatible with water. The organic solvent compatible with water includes, for example, alcohols such as methanol, ethanol, propanol, etc.; ketones such as acetone, methyl ethyl ketone, etc.; esters such as methyl acetate, ethyl acetate, etc. These solvents may be used singly or as a mixed solvent of two or more thereof on the case-by-case basis. The mixed solvents of water and an organic solvent compatible with water preferably contains the organic solvent in such an amount that there is no fear about ignition, explosion or safety in handling is ensured as to virulence, etc. Specifically, the amount of the organic solvent is preferably 50% by weight or less, and more preferably 30% by weight or less.

The pH of the polymer scale preventive agent of the present invention is preferably in the range of 7.5 to 13.5, more preferably 8.0 to 12.5. As an alkaline compound to be used for adjusting pH, for example, alkali metal compounds such as LiOH, NaOH, KOH, $Na_2CO_3$, $Na_2SiO_3$, $Na_2HPO_4$, $NH_4OH$ and the like, ammonium compounds, and organic amine compounds such as ethylenediamine, propylenediamine, monoethanolamine, triethanolamine and the like, can be used.

The concentration of the condensation product of the components (A) and (B) in the alkaline solution is not limited as long as a total coating weight described later can be obtained. Normally, the concentration is in the range of about 0.005 to about 10% by weight, preferably 0.01 to 5% by weight.

To the polymer scale preventive agent described above is preferably added a cationic, nonionic or anionic surface active agent, as long as the polymer scale preventing effect is not impaired. Further, a water-soluble polymeric compound such as cationic polymeric compounds, anionic polymeric compounds and amphoteric polymeric compounds can be optionally added.

The cationic polymeric compound includes cationic polymeric electrolytes containing a nitrogen atom with positive charge in the side chain, including, for example, polyvinylamines, polyethyleneamines, polyethyleneimines, polyacrylamides, N-vinyl-2-pyrrolidone/acrylamide copolymer, cyclic polymers of dimethyliamylammonium chloride, cyclic polymers of dimethyldiethylammonium bromide, cyclic polymers of diallylamine hydrochloride, cyclic polymers of dimetyldiallylammonia chloride and sulfur dioxide, polyvinylpyridines, polyvinylpyrrolidones, polyvinylcarbazoles, polyvinylimidazolines, polydimethylaminoethyl acrylates, polydimethylaminoethyl methacrylates, polydiethylaminoethyl acrylate, and polydiethylaminoethyl mthacrylate.

The anionic polymeric compound includes, for example, anionic polymeric compounds having a carboxyl group or sulfonic acid group in the side chain as exemplified by sulfomethylated compounds of polyacrylamide, polyacrylic acid, alginic acid, an acrylamide/vinylsulfonic acid copolymer, polymethacrylic acid and polystyrenesulfonic acid, and alkali metal salts or ammonium salts of these, and carboxymethyl cellulose.

The amphoteric polymeric compounds include, for example, glue, gelatin, casein, and albumine.

Further, inorganic compounds can be optionally added to the coating liquid as long as the scale preventing effect is not impaired. The inorganic compounds which may be added include, for example, silicic acids or silicates such as orthosilicic acid, metasilicic acid, mesodisilicic acid, mesotrisilicic acid, mesotetrasilicic acid, sodium metasilicate, sodium orthosilicate, sodium disilicate, sodium tetrasilicate and water glass; metallic salts such as oxygen acid salts, acetates, nitrates, hydroxides or halides of a metal selected from alkali earth metals such as magnesium, calcium, and barium, zinc family metals such as zinc, aluminum family metals such as aluminum, and platinum family metals such as ruthenium, rhodium, palladium, osmium, iridium and platinum; and inorganic colloids such as ferric hydroxide colloid, colloidal silica, colloid of barium sulfate, and colloid of aluminum hydroxide. The above-mentioned inorganic colloids may be those prepared, for example, by mechanical crushing, irradiation with ultrasonic wave, electrical dispersion or chemical methods.

Formation of the coating

The polymer scale preventive agent is applied to the inner walls of a polymerization vessel and then dried sufficiently at a temperature from room temperature to 100° C., for instance, followed by washing with water if necessary, to form the coating.

The polymer scale preventive agent is preferably applied to not only the inner wall surfaces of a polymerization vessel but also other areas with which the monomer comes into contact during polymerization to form the coating on such areas. For example, on an agitating shaft, agitating blades, baffles, condensers, headers, search coil, bolts, nuts, etc.

More preferably, for formation of the coating, the polymer scale preventive agent is applied to areas with which the monomer does not come into contact during polymerization but on which polymer scale may be deposited, for example, areas with which unreacted monomer comes into contact of an unreacted monomer recovery system; specifically the inner surfaces, etc. of equipment and pipes of the recovery system. Specifically, such areas include the inner surfaces of monomer distillation columns, condensers, monomer stock tanks and valves.

The method of applying the scale preventing agent is not particularly limited, and includes, for example, the brush coating, spray coating, the method of filing the polymerization vessel with the coating solution followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive agent, is not limited, either. Following methods can be used. That is, a method in which, after the agent is applied, hot air with an suitable elevated temperature is blown to the coated surface, and a method in which the inner wall surface of a polymerization vessel and the surfaces of other parts to be coated are previously heated to 30 to 80° C., and the polymer scale preventive agent is directly applied to the heated inner wall surfaces, etc. After dried, the coated surfaces are washed with water if necessary.

The coating thus obtained has a coating weight of normally 0,001 $g/m^2$ to 5 $g/m^2$, and preferably from 0.05 to 2 $g/m^2$.

The coating operation may be conducted every one to ten-odd batches of polymerization run. The formed coating has good durability and retains the scale-preventing action; therefore the coating operation may be performed every several batches of polymerization. Thus, the polymerization vessel can be used repeatedly without deposition of polymer scale, and productivity is improved.

Polymerization

After the formation of the coating on the inner wall surfaces of a polymerization vessel, and preferably other parts with which monomer may come into contact during polymerization, polymerization is carried out in accordance with conventional procedures. That is, a monomer having an ethylenically unsaturated double bond, a polymerization initiator, and optionally a polymerization medium such as water, etc., a suspending agent, a solid dispersing agent, a dispersing agent such as nonionic or anionic surfactants are charged into the polymerization vessel, followed by carrying out polymerization according to conventional methods.

The monomer having an ethylenically unsaturated double bond to which of this invention can be applied may include, for example, vinyl halides such as vinyl chloride; vinyl esters such as vinyl acetate and vinyl propionate; acrylic acid, methacrylic acid, and esters or salts thereof; maleic acid, fumaric acid, and esters or anhydrides thereof; and diene monomers such as butadiene, chloroprene and isoprene; styrene, acrylonitrile, vinylidene halides such as vinylidene chloride, and vinyl ethers. These may be used singly or in combination of two Or more.

There are no particular limitations on the type of polymerization to which this invention can be applied. The present invention is effective in any type of polymerization such as suspension polymerization, emulsion polymerization, solution polymerization, bulk polymerization, and gas phase polymerization. Particularly, the present invention is more suitable to suspension or emulsion polymerization in an aqueous medium.

In the following, general conditions are described on each type of polymerizations.

In the case of suspension or emulsion polymerization, first, water and a dispersing agent are charged into a polymerization vessel, and thereafter a polymerization initiator is charged. Subsequently, the inside of the polymerization vessel is evacuated to a pressure of 0.1 to 760 mmHg, and a monomer is then charged (whereupon the pressure inside the polymerization vessel usually becomes from 0.5 to 30 $kgf/cm^2$.G). Thereafter, polymerization is carried out at a temperature of from 30° to 150° C. During the polymerization, one or more of water, a dispersing agent and a polymerization initiator may be added, if necessary. Reaction temperature during the polymerization is different depending on the kind of monomer to be polymerized. For example, in the case of polymerizing vinyl chloride, polymerization is carried out at 30° to 80° C.; in the case of polymerizing styrene, polymerization is carried out at 50° to 150° C. The polymerization may be judged to be completed when the pressure inside the polymerization vessel falls to from 0 to 7 $kgf/cm^2$.G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

In solution polymerization, an organic solvent such as toluene, xylene and pyridine is used as the polymerization medium in place of water. The dispersing agent is optionally used. The other conditions are generally the same as those described for suspension and emulsion polymerizations.

In bulk polymerization, after the inside of a polymerization vessel is evacuated to a pressure of from about 0.01 mmHg to about 760 mmHg, a monomer and a polymerization initiator are charged into the polymerization vessel, and then polymerization is carried out at a temperature of from −10° C. to 250° C. Specific methods of the bulk polymerization includes, for example, liquid bulk polymerization and gas phase polymerization.

The present invention makes it possible to prevent polymer scale from being deposited, independent of materials constituting the inner wall, etc. of a polymerization vessel. For example, this invention can prevent deposition of polymer scale even in the case polymerization is carried out in a polymerization vessel made of a steel including stainless steel or lined with glass.

Any additive materials that have been conventionally added in a polymerization system can be used without any limitation. More specifically, the method of this invention can effectively prevent polymers from being deposited, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, acumyl peroxyneodecanoate, cumene hydroperoxide, cyclohexanone peroxide, t-butyl peroxypivalate, bis(2-ethoxylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis- 2,4-dimethylvaleronitrile, potassium peroxodisulfate, ammonium peroxodisulfate, and p-menthane hydroperoxide; suspension agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and gelatin; solid dispersing agent's such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene; and pH adjusters.

Addition to polymerization mass

The polymer scale preventive agent of the present invention may be added to a polymerization mass in addition to the formation of the coating, so that the scale preventing effect is further improved. The amount of the polymer scale preventive agent to be added to the polymerization mass preferably in the range of about 10 to about 1,000 ppm based on the whole weight of the monomers charged. The addition should be conducted so that it may not adversely affect the quality of polymeric products to be obtained with respect to fish eyes, bulk density, particle size distribution, etc.

EXAMPLES

The working examples of the present invention and comparative examples will now be described below. In each table below, experiments marked with * are comparative examples and the other working examples of the present invention.

Production Example 1

Production of Condensation Product No.1

0.3 mol of 4,4'-diaminodiphenylmethane was added to acetone and dissolved therein under agitating at room temperature. Separately, 0.3 mol of pyromellitic anhydride was added to acetone and dissolved therein under agitating at room temperature.

The resulting acetone solution of 4,4'-diaminodiphenylmethane and the acetone solution of pyromellitic anhydride were charged into an autoclave and mixed. The resulting mixture was subjected to reaction at room temperature (20 to 30° C.) for 10 hours. After the completion of the reaction, a condensation product that settled was filtered off and then dried in vacuum at room temperature. The condensation product thus obtained is referred to as Condensation Product No.1

Production of Condensation Product Nos.2–14

In each production, the procedure of production for Condensation Product No.1 described above was repeated, except for using an aromatic amine compound having at least two amino groups (A) and an aromatic tetracarboxylic acid anhydride (B) as given in Table 1 and a solvent as given in Table 2, to produce a condensation product. In Table 2, total mol numbers of the components (A) and (B), (A):(B) ratio, and reaction time in each production are given. Thus, Condensation Product Nos. 2 to 14 were obtained.

TABLE 1

| Condensation product No. | (A) Aromatic amine compound | (B) Aromatic tetracarboxylic anhydride |
|---|---|---|
| 1 | 4,4'-Diaminodiphenylmethane | Pyromellitic anhydride |
| 2* | 4,4'-Diaminodiphenylmethane | — |
| 3* | — | Pyromellitic anhydride |
| 4 | 4,4'-Diaminodiphenylether | Pyromellitic anhydride |
| 5 | 4,4'-Diaminodiphenylsulfone | 1,2,5,6-Naphthalenetetracarboxylic dianhydride |
| 6 | 4,4'-Diaminobenzanilide | Pyromellitic anhydride |
| 7 | 4,4'-Diaminodiphenylsulfide | 2,6,2',6'-Biphenyltetracarboxylic dianhydride |
| 8 | 4,4'-Diaminodiphenylpropane | 2,3,6,7-Naphthalenetetracarboxylic dianhydride |
| 9 | p-Diaminobenzene | 3,4,3',4'-Biphenyltetracarboxylic dianhydride |
| 10 | 3,3'-Dimethyl-4,4'-diaminobiphenyl | 2,2'-Bis(3,4-dicarboxyphenyl)-propanoic dianhydride |
| 11 | 4,4'-Diaminodiphenylamine | 2,3,4,5-Thiophenetetracarboxylic dianhydride |
| 12 | 1,5-Diaminonaphthalene | 3,4,3',4'-Benzophenonetetracarboxylic dianhydride |
| 13 | 3,6-Diaminoacridine | Pyromellitic anhydride |
| 14 | 4,4'-Diamin-3,3-biphenyldiol | Pyromellitic anhydride |
| 15 | 4,4'-Diaminostilbene-2,2'-disulfonic acid | 3,4,3',4'-Biphenyltetracarboxylic dianhydride |
| 16 | 4,4'-Diaminostilbene-2,2'-disulfonic acid | 3,4,3',4'-Biphenyltetracarboxylic dianhydride |
| 17 | 2,5-Diaminobenzenesulfonic acid | 1,2,5,6-Naphthalenetetracarboxylic dianhydride |
| 18 | 3,5-Diaminobenzoic acid | 2,6,2',6'-Biphenyltetracarboxylic dianhydride |

TABLE 2

| Condensation product No. | Total of (A) + (B) (mol No.) | (A):(B) (mol ratio) | Solvent | Reaction time (hour) |
|---|---|---|---|---|
| 1 | 0.6 | 1:1 | Acetone | 10 |
| 2* | 0.3 | — | Acetone | — |
| 3* | 0.3 | — | Acetone | — |
| 4 | 0.4 | 1:1 | Acetone | 10 |
| 5 | 0.4 | 1:1.5 | Dimethylformamide | 80 |
| 6 | 0.4 | 1:0.75 | Acetone | 10 |
| 7 | 0.8 | 1:1 | Dimethylsulfone | 60 |
| 8 | 0.8 | 1:1 | Dimethylsulfone | 60 |
| 9 | 0.6 | 1:0.8 | Acetonitrile | 80 |
| 10 | 0.6 | 1:0.8 | Pyridine | 60 |
| 11 | 0.4 | 1:1 | Tetrahydrofuran | 40 |
| 12 | 0.4 | 1:1 | Methylethylketone | 40 |
| 13 | 0.4 | 1:1 | Acetone | 10 |

TABLE 2-continued

| Condensation product No. | Total of (A) + (B) (mol No.) | (A):(B) (mol ratio) | Solvent | Reaction time (hour) |
|---|---|---|---|---|
| 14 | 0.4 | 1:1 | Dimethylformamide | 100 |
| 15 | 0.8 | 1:1 | Dimethylformamide | 40 |
| 16 | 0.8 | 1:2 | Dimethylformamide | 40 |
| 17 | 0.8 | 1:1 | Dimethylformamide | 40 |
| 18 | 0.8 | 1:1 | Dimethylformamide | 40 |

Example 1 (Experiment Nos. 101 to 115)

In each experiment, polymerization was conducted using a stainless steel polymerization vessel with an inner capacity of 1,000 liters and having an agitator, as described below.

First, a polymer scale preventive agent as shown in Table 3 (solvent composition, concentration of a condensation product and pH) was prepared using a condensation product, a solvent and an alkaline compound given in Table 3. The polymer scale preventive agent was applied to the inner wall, the agitating shaft, the agitating blades and other areas with which a monomer comes into contact of the polymerization vessel. The applied polymer scale preventive agent was dried by heating at 40° C. for 15 minutes to form a coating, which was then washed with water.

Thereafter, into the polymerization vessel in which the coating was formed as above, 400 kg of water, 200 kg of vinyl chloride, 250 g of a partially saponified polyvinyl alcohol, 25 g of hydroxypropyl methyl cellulose and 70 g of 3,5,5-trimethylhexanoyl peroxide were charged, followed by polymerization at 66° C. for 6 hours. After the completion of the polymerization, the produced polymer was taken out and unreacted monomer was recovered out of the polymerization vessel. Subsequently, the inside of the polymerization vessel was washed with water and residual resin was removed.

A batch of operations of charging the materials into the polymerization vessel through polymerization to washing with water as described above (excluding the operation of forming the coating) was repeated. The number of repetition of the batch for each experiment was given in Table 4. After the final batch, the amount of polymer scale deposited on an area located in the liquid phase during polymerization and on an area in the vicinity of the interface between the gas and liquid phases, was measured according the method below. The results are given in Table 4.

Measurement of the amount of polymer scale

The scale deposited in an area of 10 cm square on the inner wall is scraped off with a stainless steel spatula as completely as possible to be confirmed with naked eyes, and then the scraped scale is weighted on a balance. Thereafter, the amount of the deposited scale per area of 1 $m^2$ is obtained by multiplying the measured value by 100.

The number of fish eyes which may appear when a polymer is formed into sheet was measured with respect to the polymers produced in the experiments according to the method below.

Measurement of fish eyes

A hundred parts by weight of a polymer, 50 parts by weight of dioctyl phthalate (DOP), 1 part by weight of dibutyltin dilaurate, 1 part by weight of cetyl alcohol, 0.25 part by weight of titanium oxide and 0.05 part by weight of carbon black are formulated to prepare a mixture. The mixture is kneaded at 150° C. for 7 minutes with 6 inch rolls, and then formed into a sheet 0.2 mm thick. The sheet is examined for the number of fish eyes per 100 $cm^2$ by light transmission.

Further, to evaluate initial coloration at the time a polymer is formed into sheet, luminosity index L was measured according to the method below.

Measurement of luminosity index L

A hundred parts by weight of a polymer, 1 part by weight of a tin laurate stabilizing agent (trade name: TS- 101, product of Akisima Chemical Co.) and 0.5 part by weight of cadmium stabilizing agent (trade name: C-100J, product of Katsuta Kako Co.), and 50 parts by weight of DOP are kneaded at 160° C. for 5 minutes with a twin roll mill, and then formed into a sheet 1 mm thick. Subsequently, this sheet is placed in a mold measuring 4 cm× 4 cm×1.5 cm (depth), and molded under heating at 160° C. and a pressure of 65 to 70 kgf/$cm^2$ for 0.2 hours to prepare a test specimen. This test specimen is measured for luminosity index L in the Hunter's color difference equation described in JIS Z 8730 (1980). The more the value of L, the lower the initial coloration.

The value of L was determined as follows. The stimulus value Y of XYZ color system is determined according to the photoelectric tristimulus colorimetry using the standard light C, photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 is adopted. Next, L is calculated based on the equation: $L=10Y^{1/2}$ described in JIS Z 8730 (1980).

The results are given in Table 4.

TABLE 3

| | Scale preventive agent | | | | |
|---|---|---|---|---|---|
| Exp. No. | Condensation product No. | Concentration (wt. %) | Alkaline Compound | pH | Solvent (Weight ratio) |
| 101 | 1 | 0.3 | Ethylenediamine | 11.5 | Water:Methanol (90:10) |
| 102* | 2* | 0.3 | Ethylenediamine | 11.5 | Water:Methanol (90:10) |
| 103* | 3* | 0.3 | Ethylenediamine | 11.5 | Water:Methanol (90:10) |
| 104 | 4 | 0.3 | Ethylenediamine | 11.0 | Water |
| 105 | 5 | 0.2 | Ethylenediamine | 11.0 | Water |
| 106 | 6 | 0.3 | Ethylenediamine | 10.0 | Water |

TABLE 3-continued

| | Scale preventive agent | | | | |
|---|---|---|---|---|---|
| Exp. No. | Conden- sation product No. | Concen- tration (wt. %) | Alkaline Compound | pH | Solvent (Weight ratio) |
| 107 | 7 | 0.3 | Ethylenediamine | 12.0 | Water |
| 108 | 8 | 0.3 | Ethylenediamine | 11.0 | Water:Methanol (90:10) |
| 109 | 9 | 0.2 | Ethylenediamine | 10.0 | Water:Methanol (90:10) |
| 110 | 10 | 0.1 | NaOH | 11.5 | Water:Methanol (90:10) |
| 111 | 11 | 0.05 | NaOH | 11.5 | Water:Methanol (90:10) |
| 112 | 12 | 0.2 | NaOH | 11.5 | Water:Methanol (90:10) |
| 113 | 13 | 0.2 | Monoethanolamine | 11.5 | Water:Methanol (90:10) |
| 114 | 14 | 0.2 | Triethanolamine | 11.5 | Water:Methanol (90:10) |
| 115 | 15 | 0.2 | Ethylenediamine | 11.0 | Water:Methanol (90:10) |
| 116 | 16 | 0.2 | Ethylenediamine | 11.0 | Water:Methanol (90:10) |
| 117 | 17 | 0.2 | Ethylenediamine | 11.0 | Water:Methanol (90:10) |
| 118 | 18 | 0.2 | Ethylenediamine | 11.0 | Water:Methanol (90:10) |
| 119* | 1 | 0.2 | — | 5.5 | Water:Methanol (90:10) |

TABLE 4

| | No. of | Results | | | |
|---|---|---|---|---|---|
| Exp. No. | repeated batches (batch) | Scale amount (g/m$^2$) | | No. of fish- eyes | L value |
| | | Liquid phase | Near the interface of gas-liquid phases | | |
| 101 | 3 | 0 | 6 | 5 | 73.0 |
| 102* | 2 | 28 | 900 | 40 | 73.0 |
| 103* | 2 | 32 | 950 | 44 | 73.0 |
| 104 | 3 | 0 | 10 | 8 | 73.0 |
| 105 | 3 | 0 | 9 | 8 | 73.0 |
| 106 | 3 | 0 | 9 | 7 | 73.0 |
| 107 | 3 | 0 | 11 | 8 | 73.0 |
| 108 | 3 | 0 | 11 | 5 | 73.0 |
| 109 | 2 | 0 | 10 | 5 | 72.5 |
| 110 | 2 | 0 | 8 | 4 | 72.5 |
| 111 | 2 | 0 | 8 | 7 | 72.5 |
| 112 | 2 | 0 | 8 | 5 | 72.5 |
| 113 | 2 | 0 | 9 | 5 | 72.5 |
| 114 | 2 | 0 | 8 | 5 | 72.5 |
| 115 | 3 | 0 | 2 | 3 | 73.0 |
| 116 | 3 | 0 | 1 | 2 | 73.0 |
| 117 | 3 | 0 | 3 | 4 | 73.0 |
| 118 | 3 | 0 | 5 | 4 | 73.0 |
| 119* | 2 | 25 | 900 | 42 | 73.0 |

Example 2 (Experiment Nos. 201 to 210)

In each experiment, polymerization was conducted using a stainless steel polymerization vessel with an inner capacity of 20 liters and having an agitator, as described below.

First, a polymer scale preventive agent as shown in Table 5 (solvent composition, concentration and pH) was prepared using a condensation product, solvent and alkaline compound given in Table 5. The polymer scale preventive agent was applied to the inner wall, the agitating shaft, the agitating blades and other areas with which a monomer comes into contact of the polymerization vessel. The applied polymer scale preventive agent was dried by heating at 40° C. for 15 minutes to form a coating, which was then washed with water.

Thereafter, into the polymerization vessel in which the coating was formed as above, 9 kg of water, 225 g of sodium dodecylbenzenesulfonate, 12 g of t-dodecyl mercaptan and 13 g of potassium peroxodisulfate were charged. After the inside of the polymerization vessel was replaced with a nitrogen gas, 1.3 kg of styrene and 3.8 kg of butadiene were charged, followed by polymerization at 50° C. for 20 hours. After the completion of the polymerization, the produced polymer was taken out and unreacted monomer was recovered out of the polymerization vessel. Subsequently, the inside of the polymerization vessel was washed with water and residual resin was removed.

A batch of operations of charging the materials into the polymerization vessel through polymerization to washing with water as described above (excluding the operation of forming the coating) was repeated. The number of repetition of the batch for each experiment was given in Table 6. After the final batch, the amount of polymer scale deposited on an area located in the liquid phase during polymerization and on an area in the vicinity of the interface between the gas and liquid phases, was measured according the method below. The results are given in Table 6.

Further, to evaluate initial coloration at the time a polymer is formed into sheet, luminosity index L was measured according to the method below. The results are given in Table 6.

Measurement of luminosity index L

To 1 kg of a polymer latex obtained was added 1 kg of 2% magnesium sulfate solution to cause aggregation and sedimentation. The sediment was filtered off, washed with a hot water at 80° to 90° C. twice or three times and dried at 40° C. for 25 hours in a vacuum dryer to give a resin. The resin was placed in a mold measuring 9×9×0.1 cm (depth), heated at 195° C. under a pressure of 50 to 60 kgf/cm$^2$ for 0.2 hours and press molded under the final pressure of 80 kgf/cm$^2$ to prepare a test specimen.

This test specimen was measured for luminosity index L in the same manner as in Example 1.

TABLE 5

| Exp. No. | Condensation product No. | Concentration (wt. %) | Alkaline compound | pH | Solvent (Weight ratio) |
|---|---|---|---|---|---|
| 201 | 1 | 0.3 | Ethylenediamine | 11.5 | Water:Methanol (90:10) |
| 202* | 2* | 0.3 | Ethylenediamine | 11.5 | Water:Methanol (90:10) |
| 203* | 3* | 0.3 | Ethylenediamine | 11.5 | Water:Methanol (90:10) |
| 204 | 6 | 0.3 | NaOH | 11.5 | Water:Methanol (90:10) |
| 205 | 7 | 0.2 | Monoethanolamine | 11.5 | Water:Methanol (90:10) |
| 206 | 8 | 0.2 | Triethanolamine | 10.5 | Water:Methanol (90:10) |
| 207 | 12 | 0.2 | Ethylenediamine | 11.0 | Water:Methanol (90:10) |
| 208 | 13 | 0.2 | Ethylenediamine | 11.0 | Water |
| 209 | 14 | 0.2 | Propyldiamine | 11.0 | Water |
| 210 | 15 | 0.3 | Ethylenediamine | 11.0 | Water:Methanol (90:10) |
| 211 | 16 | 0.3 | Ethylenediamine | 11.0 | Water:Methanol (90:10) |
| 212 | 17 | 0.3 | Ethylenediamine | 11.0 | Water:Methanol (90:10) |
| 213 | 18 | 0.3 | Ethylenediamine | 11.0 | Water:Methanol (90:10) |
| 214* | 1 | 0.3 | — | 5.5 | Water:Methanol (90:10) |

TABLE 6

| Exp. No. | No. of repeated batches (batch) | Results Scale amount (g/m²) Liquid phase | Near the interface of gas-liquid phases | L value |
|---|---|---|---|---|
| 201 | 3 | 2 | 10 | 85.0 |
| 202* | 2 | 30 | 380 | 85.0 |
| 203* | 2 | 35 | 370 | 85.0 |
| 204 | 3 | 4 | 12 | 85.0 |
| 205 | 3 | 6 | 11 | 85.0 |
| 206 | 3 | 6 | 11 | 85.0 |
| 207 | 2 | 5 | 10 | 84.7 |
| 208 | 2 | 5 | 8 | 84.7 |
| 209 | 2 | 4 | 8 | 84.7 |
| 210 | 3 | 3 | 6 | 85.0 |
| 211 | 3 | 1 | 5 | 85.0 |
| 212 | 3 | 5 | 8 | 85.0 |
| 213 | 3 | 5 | 8 | 85.0 |
| 214* | 2 | 30 | 280 | 85.0 |

We claim:

1. A process of producing a polymer of an ethylenically unsaturated double bond, which comprises polymerizing the monomer in a polymerization vessel having a polymer scale preventive coating on its inner wall surfaces, wherein said coating has been formed by applying an alkaline solution containing a condensation product of (A) an aromatic amine compound having at least two amino groups and (B) an aromatic tetracarboxylic acid anhydride, followed by drying.

2. The process of claim 1, wherein the component (A) comprises at least one compound selected from the group consisting of the compounds represented by the formulas (1) to (13):

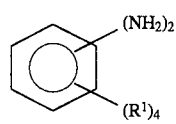
(1)

wherein the plural $R^1$ may be the same or different and are each an atom or group selected from the group consisting of —H, —$NH_2$, —Cl, —OH, —$NO_2$, —$COCH_3$, —$OCH_3$, N($CH_3$)$_2$, —COOH, —$SO_3H$ and alkyl groups having 1 to 3 carbon atoms;

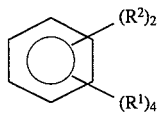
(2)

wherein the plural $R^1$ may be the same or different and each are as defined above, and $R^2$ may be the same or different and each are an amino group-containing alkyl group having 1 to 10 carbon atoms;

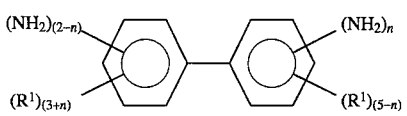
(3)

wherein the plural $R^1$ may be the same or different and are each as defined above, and n is an integer of 1 or 2;

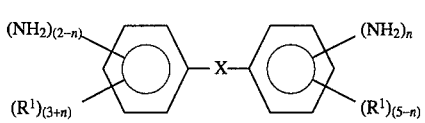
(4)

wherein the plural $R^1$ may be the same or different and are as defined above, n is also as defined above, and X is a divalent alkylene group having 1 to 5 carbon atoms, —CH=CH—, —N=N—, —N($CH_3$)—, —CONH—, —P(=O)H—, —$SO_2$—, —O—, —S, —Si(R)$_2$—, where R is an alkyl group containing 1 to 10 carbon atoms, or the group having the formula:

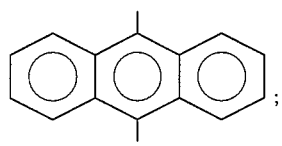
(5)

;

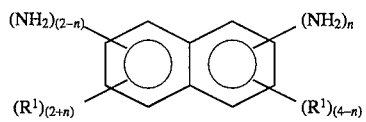

wherein the plural $R^1$ may be the same or different, and are each as defined above, and n is as defined above;

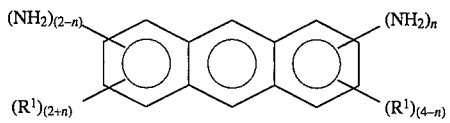 (6)

wherein the plural $R^1$ may be the same or different and are each as defined above;

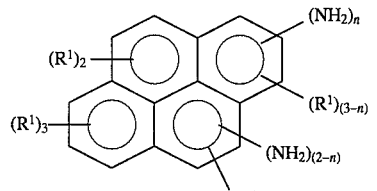 (7)

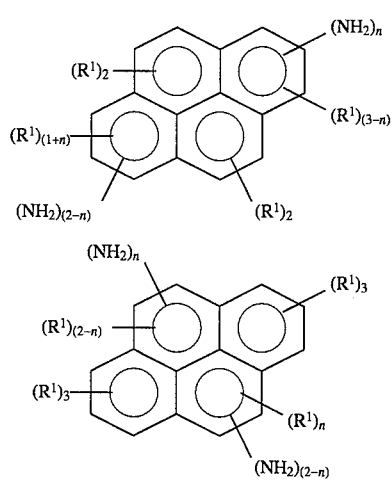 (8)

(9)

wherein the plural $R^1$ may be the same or different and are each as defined above and n is as defined above;

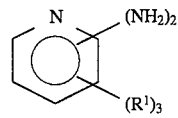 (10)

wherein the plural $R^1$ may be the same or different and each as defined above and n is as defined above;

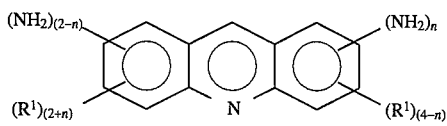 (11)

wherein the plural $R^1$ may be the same or different and are each as defined above, and n is as defined above;

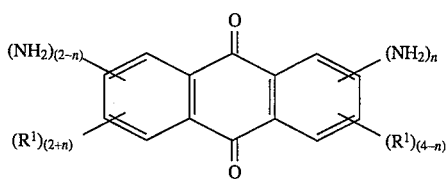 (12)

wherein the plural $R^1$ may be the same or different and each as defined above, and n is as defined above;

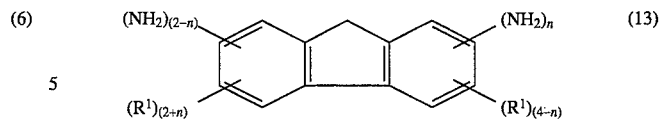 (13)

wherein the plural $R^1$ may be the same or different and are each as defined above, and n is as defined above.

3. The process of claim 1, wherein the component (A) comprises at least one compound selected from the group consisting of 4,4,-diaminodiphenylmethane, 4,4'-diaminodiphenyl ether, 4,4-diaminodiphenyl sulfone, 4,4-diaminobenzanilide, 4,4,-diaminodiphenyl sulfide, 4,4,-diaminodiphenylpropane, p-aminobenzene, 3,3'-dimethyl 4,4'-diaminobiphenyl, 4,4,-diamino-3,3'-biphenyldiol, 4,4,-diaminodiphenylamine, 3,5-diaminobenzoic acid, 2,5-diaminobenzenesulfonic acid, and 4,4'-diaminostilbene 2,2'-disulfonic acid.

4. The process of claim 1, wherein the component (B) comprises at least one compound selected from the group 2,2'-bis(3,4-consisting of pyromellitic anhydrides, dicarboxyphenyl)propanoic dianhydride, 2,3,6,7-naphthalenetetracarboxylic dianhydride, bis(3,4-carboxyphenyl)sulfon dianhydride, 3,4,3',4'-biphenyltetracaboxylic dianhydride, 3,4,9,10-perylenetetracarboxylic dianhydride, 1,2,5,6-naphthalenetetracarboxylic dianhydride, bis(3,4-dicarboxyphenyl) ether dianhydride, 2,3,2',3'-biphenyltetracarboxylic dianhydride, 3,4,3',4'-benzophenonetetracarboxylic dianhydride, 2,3,4,5-thiophenonetetracarboxylic dianhydride, and 2,6,2',6'-biphenyltetracarboxylic dianhydride.

5. The process of claim 1, wherein the component (B) comprises at least one compound selected from the group consisting of pyromellitic anhydride, 1,2,5,6-naphthalene tetracarboxylic dianhydride, 2,3,6,7-naphthalene tetracarboxylic dianhydride, 3,4,3',4'-biphenyltetracarboxylic dianhydride, and 2,6,2',6'-biphenyltetracarboxylic dianhydride.

6. The process of claim 1, wherein the condensation product is obtained by condensing the component (A) and the component (B) in an amount of 0.01 to 5 parts by weight per part by weight of the component (A).

7. The process of claim 1, wherein the alkaline solution contains water as solvent.

8. The process of claim 1, wherein the alkaline solution contains a mixed solvent of water and an organic solvent compatible with water.

9. The process of claim 8, wherein the mixed solvent contains the organic solvent in an amount of 50% by weight or less.

10. The process of claim 1, wherein the alkaline solution has a pH of 7.5 to 13.5.

11. The process of claim 1, wherein the condensation product of the components (A) and (B) is contained in a concentration of 0.005 to 10% by weight.

12. The process of claim 1, wherein said polymerization is conducted as suspension polymerization, emulsion polymerization, solution polymerization, bulk polymerization or gas phase polymerization.

13. The process of claim 1, wherein said monomer is selected from the group consisting of vinyl esters; vinyl halides; vinylidene halides; acrylic acid, methacrylic acid and their esters and salts; diene monomers; styrene; acrylonitrile; α-methylstyrene; and vinyl ethers.

* * * * *